United States Patent [19]

Schepers et al.

[11] 3,890,408

[45] June 17, 1975

[54] PROCESS FOR PREPARING BLOCK COPOLYMERS

[75] Inventors: Herman A. J. Schepers, Stein; Bernard C. Roest, Geleen, both of Netherlands

[73] Assignee: Stamicarbon, N.V., Geleen, Netherlands

[22] Filed: June 30, 1972

[21] Appl. No.: 268,173

[30] Foreign Application Priority Data

July 2, 1971 Netherlands .................... 7109142

[52] U.S. Cl. .............................. 260/879; 260/880 B
[51] Int. Cl. ........................ C08f 19/08; C08f 15/18
[58] Field of Search ............ 260/879, 880 B, 94.2 M

[56] References Cited
UNITED STATES PATENTS

| | | | |
|---|---|---|---|
| 3,448,176 | 6/1969 | Balas | 260/879 |
| 3,621,077 | 11/1971 | Donat | 260/880 B |

Primary Examiner—John C. Bleutge
Attorney, Agent, or Firm—Cushman, Darby & Cushman

[57] ABSTRACT

Block copolymers of the general configuration A—B—C— and B—C are prepared according to the process disclosed by preparing by means of a lithium based anionic initiator a polymer form a conjugated diene having at least one terminal dienyl anion. Said polymer may optionally have a non-elastomeric polymer block A attached thereto. The said polymer is reacted with a compound $CH_2=R_1R_2$ such as diphenyl ethylene and subsequently with a 1-alkyl-ethylenecarboxylic acid ester. Illustrative are poly(methyl methacrylate)-polydiene-poly(methyl methacrylate) block copolymers.

Blockcopolymers so obtained are soluble in several organic solvents. Novel block copolymers are also disclosed.

9 Claims, No Drawings

PROCESS FOR PREPARING BLOCK COPOLYMERS

BACKGROUND OF THE INVENTION

The present invention relates to a process for preparing a block copolymer of the general formula A—B—C or (B—C)$_n$, where A is a non-elastomeric polymer block, B an elastomeric polymer block from a conjugated diene, and C is/are polymer block(s) from a 1-alkyl-ethylene-carboxylic ester, by preparing a polymer having at least one terminal dienyl anion by means of an anionic initiator and then adding at least one 1-alkyl-ethylene-carboxylic ester and continuing the polymerization.

It is known according to British Pat. No. 852,823 that block copolymers can be prepared by the "living polymer" principle; according to this method, a block copolymer is prepared by using an anionic initiator to polymerize a first monomer into a polymer that, dependent on the functions of the initiator used, carries one or more terminal negative charges and which is called the living polymer. If a second monomer is added to this living polymer without the living polymer meanwhile being deactivated, the polymerization of the second monomer is initiated by the living polymer itself which was, in turn, produced from the first monomer, the block copolymer thus obtained can be deactivated and recovered from the solution, but may also be used in turn to polymerize an additional monomer.

A special class of block copolymers that can be prepared by this principle includes the group of block copolymers of general formula A—B—C, where A and C are both non-elastomeric polymer blocks usually from a vinyl monomer and B an elastomeric polymer block. In the unvulcanized condition these block copolymers already have elastomeric properties that are comparable to the elastomeric properties of conventional vulcanized rubbers. The usual block copolymers of this type are built up of styrene and a conjugated diene, such as, e.g., isoprene or butadiene. These polystyrene-polydiene-polystyrene block copolymers, however, have the drawback the elastomeric properties are soon lost when the temperature is raised, for example in the vicinity of about 50°C.

In non-prepublished Netherlands Pat. No. 6,918,130 which corresponds to copending application Ser. No. 93,829 filed Nov. 30, 1970, the disclosure of which is hereby incorporated by reference, the same inventors as herein have proposed to prepare block copolymers of the general formula A—B—C, where A is a non-elastomeric polymer block, B an elastomeric polymer block, preferably from a conjugated diene, and A or C or both are polymer blocks from an acrylic monomer, such as, e.g., an acrylic ester or an alkyl acrylic ester. Block copolymers of this type can be produced by preparing a polymer having at least one terminal dienyl anion by means of an anionic initiator and then adding an acrylic monomer and continuing the polymerization.

In this manner a polymethyl methacrylate-polydiene-polymethyl methacrylate block copolymer can be prepared by using a polyfunctional anionic initiator to polymerize a conjugated diene into an elastomeric polymer block that, depending on the functions of the initiator used, has two or more terminal dienyl anions, and then adding methyl methacrylate and continuing the polymerization.

Similarly a polystyrene-polydiene-polymethyl methacrylate block copolymer can be prepared by polymerizing styrene with the aid of a monofunctional initiator, then polymerizing a conjugated diene, which produces a block copolymer having a terminal dienyl anion, and subsequently adding methyl methacrylate and continuing the polymerization. These block copolymers so produced exhibit tolerance of relatively high temperatures, often of the order of about 80° to 120°C. In addition, such block copolymers have a good clarity.

However, a drawback of such block copolymers is that they are insoluble or only very poorly soluble in liquid hydrocarbons, so that it is almost impossible to use them in coatings and glues. Also the processability of such block copolymers by an injection-molding or extrusion method is very poor, since the melt index is usually very low. In addition to problems with ultimate uses and applications poor solubility of such block copolymers in hydrocarbons also presents difficulties in their preparation as elastomeric block copolymers are usually prepared in hydrocarbons or a mixture of solvents containing hydrocarbons. During preparation the block copolymer becomes partly insoluble in the hydrocarbon solvent used, so that it separates out as a gel already before the polymerization into the polymer block from the acryl ester has been completed. This gives rise to cross-linked block copolymers with a great variation of the average molecular weights of the polymer blocks from the acryl esters and as a result optimum elastomeric properties are not obtained. The removal from the reaction vessel of the block copolymer that has separated from the solution obviously presents another problem.

DETAILED DESCRIPTION OF THE INVENTION

The present invention provides a new and improved process for preparing block copolymers of the general formula A—B—C or (B—C)$_n$, where A is a non-elastomeric polymer block, B an elastomeric polymer block from a conjugated diene, and C and optionally A a polymer block from a 1-alkyl-ethylene-carboxylic ester, that are more soluble in hydrocarbons. The invention furthermore is directed to providing such block copolymers having improved processability owing to an improved high melt index. Also disclosed are new block copolymers that can be prepared in hydrocarbon solvents in a simple way.

The process according to the present invention for preparing a block copolymer of the general formula A—B—C or (B—C)$_n$, where A is a non-elastomeric polymer block, B an elastomeric polymer block from a conjugated diene, and C and optionally A a polymer block from a 1-alkyl-ethylene-carboxylic ester, by preparing a polymer having at least one terminal dienyl anion by means of an anionic initiator, and then adding one or more 1-alkyl-ethylene-carboxylic esters and continuing the polymerization is characterized in that a compound of the general formula $CH_2\!=\!C\ R_1R_2$, where $R_1$ and $R_2$ are aryl or aralkyl groups, is added after the polymerization of the conjugated diene into a polymer block of the desired molecular weight.

1-alkyl-ethylene-carboxylic esters that can be used according to the present invention to form polymer block C and optionally polymer block A are those compounds that have been derived from a 1-alkyl-ethylene-carboxylic acid, the alkyl group having 1-4 carbon atoms, and a monovalent alcohol with 1 - 10 carbon atoms. The alcohol may be linear or branched and illustrative examples of such alcohols include methanol, ethanol propanol-1, butanol-1, pentanol-1, hexanol-1, octanol-1, decanol-1, propanol-2, 2-methylpropanol-1, butanol-2, 2-methylethanol-2, 2-methyl-butanol-1, and the like. The alkyl group of the 1-alkyl-ethylene-carboxylic acid may contain 1–4 carbon atoms and examples of such alkyl groups include methyl, ethyl, propyl, butyl and the branched isomers thereof. Accordingly, some examples of esters of 1-alkyl-ethylene-carboxylic acid that may be used are methyl methacrylate, ethyl methacrylate, butyl methacrylate, butyl ethacrylate, the 1-ethyl-ethylene-carboxylic esters of 2-methyl propanol-1 and propanol-2, and the like. Preferred is methyl methacrylate. When polymerized these monomers form a polymer block having a number average molecular weight of from about 200 to about 100,000, preferable from about 2,000 to about 50,000 and a glass transition point above 25°C, preferable above about 50°C.

The conjugated dienes that may be used for the preparation of the elastomeric polymer block B are, in general, those conjugated dienes that have 4 to 12 carbon atoms per molecule and preferably 4 to 8 carbon atoms. Some examples of such conjugated dienes are 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3,4-dimethyl-1,3-hexadiene, 2-phenyl-1,3-butadiene. Preference is given to isoprene and butadiene. Use may also be made of compatible mixtures of these dienes. When polymerized the diene monomers for a polymer block B having a number average molecular weight between about 25,000 and 1,000,000, preferable between about 25,000 and 150,000 and a glass transition point below about 0°C; the total block B content is from about 60 to 90 weight percent of the said copolymer.

In the preparation of the elastomeric polymer block B it is also possible to copolymerize conjugated dienes, e.g. with monovinyl-aromatic compounds such as styrene.

The non-elastomeric polymer block A, if not built up of a 1-alkyl-ethylene-carboxylic ester as defined above, may be any non-elastomeric polymer block having a number average molecular weight between about 200 and 100,000 preferable between about 2,000 and 50,000 and a glass transition point of above 25°C. Preferably polymer block A is prepared from one or more monoalkenyl aromatic compounds, such as styrene, methyl styrene, chlorostyrene or α-methylstyrene.

The compound of the general formula $CH_2=C\ R_1R_2$ is a compound in which $R_1$ and $R_2$ independently represent an aryl group having from 6 to 18 carbon atoms or an aralkyl group having from 6 to 18 carbon atoms. Some examples of such compounds are 1,1-diphenyl ethylene, 1,1-di-(p-methyl-phenyl)-ethylene, 1,1-di-(p-methyl-phenyl) ethylene, 1,1-di-(p-hexyl-phenyl)ethylene, 1,1-di-naphthyl ethylene, and the like. Preferably, however, 1,1-diphenyl ethylene and 1-phenyl-1-naphthyl ethylene are used as these compounds are prepared on a commercial scale and readily available.

Desirably the compound of the general formula $CH_2=C\ R_1R_2$ is not added to the polymerization mixture until the polymerization of the conjugated diene has proceeded to an extent such that an elastomeric polymer block of the desired molecular weight has been formed. Generally the molecular weight is within the range of between about 50,000 to about 150,000. The reason for this delayed addition is that it has been found that the terminal dienyl anion of the living polymer is so modified by the addition of such compounds to the polymerization mixture that the resulting anion is only very slow in initiating the polymerization of the conjugated diene.

The amount in which the compound of the general formula $CH_2=C\ R_1R_2$ can be added may vary within wide limits, however, amounts ranging between 0.1 to 10 times and particularly 0.5 to 5 times the molar amount of anionic initiator used. The amount added is preferably an almost equimolar amount with respect to the amount of initiator used, as hereinafter described.

Although we do not wish to be bound by any particular theories, we believe that, by addition of a compound of the general formula $CH_2=C\ R_1R_2$ to the polymerization mixture after the elastomeric polymer block has formed from the conjugated diene, the resulting dienyl anion will be sterically hindered such that it no longer gives rise to secondary reactions, such as by reaction with the carbonyl group of the 1-alkyl-ethylene-carboxylic ester. A secondary reaction of this type gives rise to premature termination of the polymerization and cross-linking of the block copolymer. The presumed suppression of this secondary reaction might explain the fact that the block copolymers according to the invention are considerably more soluble in hydrocarbons and that the block copolymers have a higher melt index so that they enjoy an advanced degree of facility of processing.

In the process according to the present invention any anionic initiator can be used. Usually these are compounds in which one or more alkaline or earthalkaline metal atoms are incorporated. Examples of anionic initiators which can be used are e.g. lithium hydrocarbons having from 1 to 18 carbon atoms, particularly alkyl and cycloalkyl derivatives such as methyl lithium, ethyl lithium, butyl lithium, hexyl lithium, cyclic hydrocarbon compounds as e.g. cyclopentyl lithium and cyclohexyl lithium, unsaturated lithium hydrocarbons such as alkyl lithium and methallyl lithium; polyfractional anionic initiators having from 1 to 18 carbon atoms having two or more reactive lithium atoms thereon, such as dilithium methane, 1,4-dilithium butane, 1,4-dilithium benzene, 1,4-dilithium cyclohexane, 1,3-dilithium cyclohexane, 1,10-dilithium decane, 1,4-dilithium butene, 1,5-dilithium naphtalene and the like. The proportion of anionic initiator to monomer or monomers present may be varied over a wide range depending upon the nature of the initiator and the monomers present. Normally 0.01 to about 25 m moles per 100 grams of monomer or monomers are used. There is, as indicated above, an interrelationship between the amount of initiator used and amount of the compound of the general formula $CH_2=C\ R_1R_2$ used and preferably nearly equal molar amounts are used.

The process according to the invention may be carried out in any inert inorganic solvent that is inert to the polymers and copolymers contained therein. Both polar and non-polar solvents may be used. Some examples of suitable solvents are hydrocarbons having 2–12 carbon atoms such as hexane, pentane, heptane, cyclic hydrocarbons such as cyclohexane, benzene and toluene as well as polar solvents such as tetrahydrofurane, dimethyl sulphoxide, and dimethyl formamide. Mixtures of suitable solvents, such as, i.e. mixtures of nonpolar solvents like gasoline and mixtures of a polar and a non-polar solvent may also be used. It is furthermore possible to change the composition of the solvent at any stage of the process according to the invention.

The polymerization reactions according to the present invention are usually carried out between −80° C and the boiling point of the solvent or solvents used at the prevailing pressure; but for simplicity and correct practice the temperature employed preferably lies between about −20° and about 70° C. The pressure at which the polymerization reaction is conducted is the range of about 500 to about 2000 mm Hg; and preferably about 700 to about 2000 mm Hg; however, higher and lower pressures may be used. Operation outside of these preferred ranges does not affect the principles of the invention but generally will only add to the cost of the process. Conventional rubber additives known in the rubber compounding art can be incorporated into the block copolymers according to the invention. Some of the examples thereof are carbon black, dyestuffs, pigments, anti-oxidants, blending oils and extender oils. The block copolymers may also be mixed with other polymeric materials, such as polystyrene, unsegmented copolymers of a conjugated diene and a monovinylaromatic compound, or copolymers of ethylene and a vinyl ester.

Furthermore, the block copolymers according to the invention may be partly hydrogenated of at least about 10% of the unsaturated linkages. These block copolymers may also be vulcanized.

The block copolymers produced according to the present invention may be used for the manufacture of glues and coatings particularly when dissolved in an organic solvent, elastomers, fibres, bicycle tires, footwear, floor-covering, domestic articles, and as carpet backing.

The following examples further illustrate the principles of the present invention as described above but without restricting same. Unless otherwise indicated all parts and percentages are by weight and a temperature are given in centigrade degrees. Melt index tests described herein were according to ASTM 1238-65-T at 265° C, tensile strength according to NEN 5602.

Comparative Example A (not according to invention)

A polyfunctional anionic initiator solution was prepared by adding 6.48 millimoles of secondary butyl lithium to 100 ml of cyclohexane and 5 ml of styrene and letting the mixture react at 70° C for 15 minutes, then adding 4 millimoles of divinyl benzene and letting the reaction continue at 70° C for 2 hours, and finally adding 10 ml of styrene and continuing the reaction at 70° C for 30 minutes. The resulting initiator solution was then diluted with 100 ml of cyclohexane. The total volume of the initiator solution thus obtained amounted to 229.2 ml.

25 ml of this initiator solution was then used to prepare a poly(methyl methacrylate)-polyisoprene-poly(methylmethacrylate) block copolymer in the following manner:

25 ml of the above initiator solution were stirred into 150 ml of toluene and 35 ml of isoprene in a nitrogen atmosphere at 50°C and polymerized for 60 minutes. After the mixture had been cooled to −40°C, 20 ml of methyl methacrylate in 100 ml of tetrahydrofuran were added and the polymerization was continued at −40°C for 60 minutes. After the addition of the methylmethacrylate, the polymer started separating out from the solution as a gel. After the polymerization had been completed by adding 10 ml of methanol, in which 0.5 g of the stabilizer known by the trade mark of Plastanox 2246 had been dissolved, the gel was only removed from the reaction vessel and the stirring equipment with difficulty.

It appeared that, at room temperature, the block copolymer thus obtained did not appreciably dissolve in organic solvents, such as cyclohexane, benzene, toluene, gasoline and ethers like tetrahydrofuran. The block copolymer had no measurable melt index at 265°C and 12.5 kg, as measured according to ASTM 1238-65-T.

Comparative Example B (not according to the invention)

A poly(methyl methacrylate)-polyisoprene-poly(methyl methacrylate) block copolymer was prepared with sodium/naphthalene as anionic initiator. The solution of sodium/naphthalene in tetrahydrofuran contained 100 millimoles of Na per liter.

32 ml of the above sodium/naphthalene solution were added to 150 ml of tetrahydrofuran and 35 ml of isoprene and polymerized at 50° C for 60 minutes. Subsequently, 30 ml of methyl methacrylate in 150 ml of tetrahydrofuran were added and the polymerization was continued for 60 minutes.

After deactivation of the resulting block copolymer, which had separated from the solution as a gel during the polymerization its melt index was determined and solubility tests were conducted. The block copolymer formed appeared to have no measurable melt index at 265° C. The block copolymer formed was not appreciably soluble in hydrocarbons, such as gasoline, and in cyclohexane aromatics, such as benzene and toluene, and in eithers, such as tetrahydrofuran.

Mechanical properties could not be determined as the block copolymer could not be processed.

EXAMPLE I

A poly(methyl methacrylate)-polyisoprene-poly(methyl methacrylate) block copolymer having a methyl-methacrylate content of 31 % by weight was prepared in the following way:

25 ml of the initiator solution of comparative Example A were stirred into 150 ml of toluene and 35 ml isoprene in a nitrogen atmosphere at 50°C and polymerized for 60 minutes. Subsequently, 0.5 ml of diphenyl ethylene was added, which produced a deep-red color. After the mixture had been cooled to −40°C, 20 ml of methyl methacrylate in 100 ml of tetrahydrofuran were added and the polymerization was continued at −40°C for 60 minutes. The polymerization was completed by adding 10 ml of methanol in which 0,5 g of the stabilizer known by the trade mark of Plastanox 2246 as described above had been dissolved.

The polymer remained in solution during the entire polymerization into the block copolymer.

The resulting block copolymer had a melt index of 5.4 at 265,20 C. It was found that at room temperature the copolymer was fully soluble in hydrocarbons, such as cyclohexane and gasoline, in ethers, such as tetrahydrofuran, and in aromatics, such as benzene and toluene.

The tensile strength of the block copolymer was 156 kg/cm² at 20°C. and still 32 kg/cm² at 70°C.

Example II

Example I was then repeated, but with the difference that the diphenyl ethylene was dissolved in 100 ml of tetrahydrofuran and not added until after cooling to −40°C and the methyl methacrylate added was dissolved in 50 ml of pentamethyl heptane.

A block copolymer was obtained which contained 31 % by weight of methyl methacrylate, a tensile strength of 181 kg/cm² at 20°C and 36 kg/cm² at 70°C, and was well soluble in the solvents mentioned in Example I. The melt index of the block copolymer obtained was 11 at 265°C.

EXAMPLE III

Example I was repeated but with the difference that 25 ml of isoprene were used and polymerized for 90 minutes, 0.7 ml of diphenyl ethylene were added, and the polymerization of the methyl methacrylate was effected at −20°C. The block copolymer obtained was soluble in organic solvents and had a tensile strength of 206 kg/cm² at 20°C and of 50 kg/cm² at 70°C and a melt index of 0.4 at 265°C.

EXAMPLE IV

Comparative Example B was repeated, but with the difference that 0.5 ml of diphenyl ethylene was added prior to the polymerization of the methyl methacrylate according to the manner of the present invention.

The block copolymer obtained was soluble in organic solvents, had a tensile strength of 135 kg/cm² at 20°C and a melt index of 6.1 at 265°C.

EXAMPLE V

Example III was repeated, but with the difference that the diphenyl ethylene was replaced by 0.487 g of naphthyl-phenyl ethylene. The polymerization mixture turned green upon the addition of this compound.

A soluble block copolymer was obtained, having an tensile strength of 196 kg/cm² at 20°C and of 50 kg/cm² at 70°C, and a melt index of 26 at 265°C

EXAMPLE VI

The block copolymer produced according to the process of Example I was used. 10 grams of this copolymer was dissolved in 75 ml of toluene as a solvent. The resulting mixture was stirred, tested for adherency and was observed to be a satisfactory glue.

What is claimed is:

1. Process for preparing an elastomeric block copolymer having the general configuration

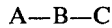

wherein A is a non-elastomeric polymer block formed from a 1-alkyl-ethylene-carboxylic acid ester derived from a 1-alkyl-ethylene carboxylic acid of 4–10 carbon atoms and wherein the alkyl group has 1–4 carbon atoms or a monoalkene aromatic compound having a number average molecular weight between about 200 and 100,000 and a glass transition point above about 25° C, B is an elastomeric conjugated diene polymer block having a number average molecular weight between about 25,000 and 1,000,000 and a glass transition point below about 0° C, C is a polymer block having a number average molecular weight between about 200 and 100,000 and a glass transition point above about 200 and 100,000 and a glass transition point above 50° C formed from a 1-alkyl-ethylene carboxylic acid ester derived from a 1-alkyl-ethylene carboxylic acid of 4–10 carbon atoms and wherein the alkyl group has 1–4 carbon atoms; said process comprising the sequential copolymerization steps of:

1. polymerizing a monomer or monomer mixture with the aid of a monofunctional lithium-based anionic initiator to form said first non-elastomer polymer block A;
2. adding a conjugated diene monomer to the reaction mixture containing said block A while continuing said polymerization under such conditions to form the said elastomeric polymer block B on non-elastomeric polymer block A;
3. adding to the reaction mixture

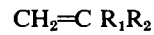

wherein $R_1$ and $R_2$ independently represent an aryl group having 6–18 carbon atoms or an aralkyl group having 6–18 carbon atoms, the amount being from 0.1 to 10 times the molar amount of the said anionic initiator, and thereafter 4. adding to the reaction mixture said 1-alkyl-ethylene carboxylic ester while continuing polymerization to form terminal block C, whereby said elastomeric block copolymer A—B—C is formed.

2. Process according to claim 1 wherein said compound of the formula $CH_2=C R_1R_2$ is selected from the group consisting of 1,1-diphenyl ethylene, 1,1-di-(p-methyl-phenyl)-ethylene; 1-phenyl-1-napthyl-ethylene; 1,1-di-(m-methyl-phenyl)-ethylene; 1,1-di-(p-ethyl-phenyl)ethylene; 1,1-di-(p-hexyl-phenyl)-ethylene or 1,1-di-naphtyl ethylene.

3. Process according to claim 2 wherein said compound is 1,1-diphenylethylene.

4. Process according to claim 1 wherein the amount of said compound is from 0.5 to 5 times the molar amount of said anionic initiator.

5. Process according to claim 1 wherein both of polymer blocks A and C are poly(methyl methacrylate) and polymer block B is polyisoprene or polybutadiene.

6. Process for preparing an elastomeric block copolymer having polymer blocks B and C wherein B is an elastomeric conjugated diene polymer block having a number average molecular weight between about 25,000 and 1,000,000 and a glass transition point below about 0 °C and c is a polymer block having a number average molecular weight between about 200 and 100,000 and a glass transition point above about 50 °C formed from a 1-alkyl-ethylene carboxylic acid ester derived from a 1-alkyl-ethylene carboxylic acid of 4 – 10 carbon atoms and wherein the alkyl group has 1 – 4 carbon atoms, said process comprising the sequential copolymerization steps of:

1. polymerizing a conjugated diene in the presence of a polyfunctional lithium-based anionic initiator to form the elastomeric polymer block B;
2. adding to the reaction mixture

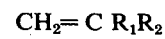

wherein $R_1$ and $R_2$ independently represent an aryl group having 6 – 18 carbon atoms or an aralkyl group having 6 – 18 carbon atoms, the amount being from 0.1 to 10 times the molar amount of said anionic initiator, and thereafter 3. adding to the reaction mixture said 1-alkylethylene carboxylic ester while continuing polymerization to form terminal block C, whereby the elastomeric block copolymer is formed.

7. Process according to claim 6 wherein said compound of the formula $CH_2=C\ R_1R_2$ is selected from the group consisting of 1,1-diphenyl ethylene, 1,1-di-(p-methyl-phenyl)-ethylene; 1-phenyl-1-naphthyl ethylene; 1,1-di-(m-methyl-phenyl)-ethylene; 1,1-di-(p-ethyl-phenyl)ethylene; 1,1-di-(p-hexyl-phenyl)-ethylene or 1,1-di-naphtyl ethylene.

8. Process according to claim 7 wherein said compound is 1,1-diphenylethylene.

9. Process according to claim 6 wherein the amount of said compound is from 0.5 to 5 times the molar amount of said anionic initiator.

* * * * *